United States Patent Office 2,739,143
Patented Mar. 20, 1956

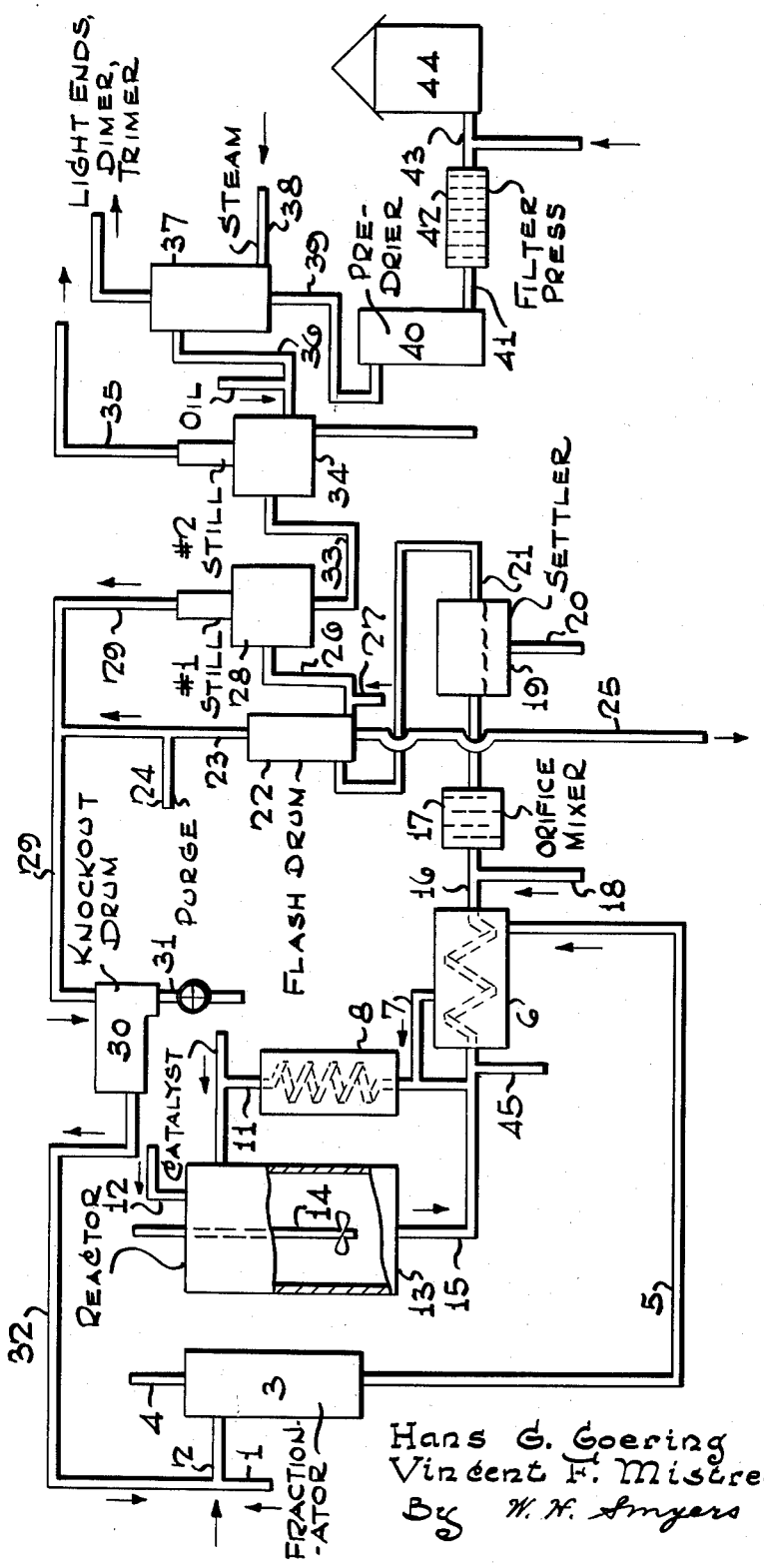

2,739,143

PROCESS FOR THE PREPARATION OF POLY-ISOBUTYLENE WITH A SLURRY CATALYST

Hans G. Goering, Elizabeth, and Vincent F. Mistretta, Fanwood, N. J., assignors to Esso Research and Engineering Company, a corporation of Delaware Application December 29, 1952, Serial No. 328,359

1 Claim. (Cl. 260—94.8)

This invention relates to the polymerization of isobutylene or hydrocarbon fractions containing it to produce highly useful polymers.

Conventional processes for the polymerization of isobutylene utilize acid-acting metal halide catalyst, such as aluminum chloride, either in the solid state or dissolved in a suitable solvent. When solid catalyst is employed, the feed is continuously circulated through a bed of the catalyst. When a dissolved catalyst is used, it is mixed with the feed and pumped into the reaction vessel.

When the bed of solid catalyst is employed, more or less local overheating occurs and much of the catalyst is therefore deactivated as the process proceeds; usually only a small portion of the catalyst is being efficiently used at any given time. A temperature gradient between the inlet and outlet of the reactor is inherent in such processes. Even when the gradient is insufficient to deactivate the catalyst, only a small part of the catalyst is at optimum temperature. In the initial stages of the process, the first 20 or 30% of the catalyst is doing the bulk of the polymerization; later this catalyst will become inactive and only the last portions of the catalyst are being used.

When a dissolved catalyst is used the system is more susceptible to poisons and cannot be easily activated. Reactions involving the use of dissolved catalysts are very fast and therefore more difficult to control. Furthermore when a hydrocarbon is used as the solvent for the catalyst, as can be done when employing aluminum bromide as the catalyst, the selection of the solvent is difficult because of the tendency of the catalyst to isomerize certain of the hydrocarbon components in the solvent, resulting in sludge formation. When the catalyst solvent is an alkyl halide, it becomes necessary to separate and purify the halide from the unreacted olefin, polymer solvent, and polymer before recycling. This involves large equipment investments and operating costs.

It has now been found that the above disadvantages can be overcome by contacting the isobutylene or the hydrocarbon fraction containing it with a slurry of aluminum chloride in a liquid diluent which is inert to the catalyst or is sufficiently inactive with it at the temperature of reaction that undesirable sludges are not formed and dissolves the polymer.

Suitable liquids for slurrying the catalyst include normally liquid alkane hydrocarbons having at least five carbon atoms such as pentane, isopentane, hexane, isohexanes, heptanes, isoheptanes, octane, isooctane, the cyclo-alkanes, solvent naphthas having boiling points between 90 and 120° C., and the like.

In one specific embodiment, the present invention comprises a process for the production of solid polymers from isobutylene or a hydrocarbon fraction containing it by dissolving the isobutylene in a solvent preferably the diluent in which the catalyst is slurried, cooling the solution to the desired temperature and then adding a slurry of aluminum chloride in the inert diluent in small increments under great agitation until an amount has been added which is slightly in excess of that necessary to initiate the reaction. By operating in this manner, the isobutylene is thoroughly mixed with the catalyst which is kept in suspension in the inert liquid. The polymerization reaction is preferably, altho not in all cases, carried out at temperatures below atmospheric. Generally, temperatures excessively below atmospheric are of no particular benefit. Ordinarily temperatures are employed within the range of $-112°$ F. to $+104°$ F. The total amount of catalyst used may vary between 0.01 and 2.0% by weight of solid aluminum chloride based on the isobutylene in the feed. This amount of catalyst is added as a 5–20% slurry in the diluent.

The temperature of preparing the slurry of the diluent and aluminum chloride is highly critical when using commercially available diluents since these materials generally contain components which form sludge with the aluminum chloride and adversely affect its activity. Two commercial hexanes having the following analyses:

| Hexane | Paraffins, percent | Aromatics, percent | Naphthenes, percent | Sp. Gr. 20/20 |
|---|---|---|---|---|
| A | 75.4 | 7.5 | 17.1 | 0.702 |
| B | 85.1 | 4.4 | 10.5 | 0.686 | were each slurried with aluminum chloride. Hexane A was found to form sludge even as low as 50° F. Although hexane B formed no sludge at room temperature, it was found to adversely affect the activity of the aluminum chloride when slurried with 5% of the catalyst for one hour at temperatures above $-10°$ F. and then used to polymerize isobutylene in 70% hexane at a temperature of $-40°$ F., as shown by the following data:

| Catalyst | Slurrying Temp., °F. | Polymer M. W. (Staudinger) |
|---|---|---|
| Solid AlCl₃ powder (blank) | | 26,300 |
| 5% AlCl₃ in hexane | +14 | 21,100 |
| 5% AlCl₃ in hexane | −4 | 22,000 |
| 5% AlCl₃ in hexane | −22 | 26,400 |
| 5% AlCl₃ in hexane | −40 | 25,700 |

From the above data, it is evident that the molecular weight of the polymer is lowered considerably when the catalyst slurry is formed at temperatures higher than $-10°$ F. Thus it is necessary that the slurry be made at temperatures no higher than $-10°$ F. if the catalyst is to be stored for an hour or more. Temperatures above $-10°$ F. can be used if the slurry is to be used immediately. On the other hand at temperatures below $-10°$ F. the catalyst slurry is quite stable as evidenced by the fact that a 10% slurry of AlCl₃ in hexane Type B gave a polymer of 24,000 M. W. on storing at $-22°$ F. for one week.

The manner in which the present invention is carried out will be fully understood from the following description when read with reference to the accompanying drawing.

A mixture of hexane and pure isobutylene in line 1 is mixed with recycled isobutylene and hexane in line 32. This recycled isobutylene, however, contains a small amount of water and isopropyl alcohol as contaminants. These are introduced by line 2 into azeotropic distillation tower 3 where the alcohol and water are removed overhead through line 4 as azeotropes with a small amount of the hydrocarbons. Pure, dry isobutylene-hexane mixture is withdrawn through line 5 and passed through heat exchanger 6 and line 7 to cooler 8, where it is cooled to the approximate polymerization temperature, e. g. $-40°$ F. From cooler 8 it is passed by line 11 to the reactor 13. A slurry of 5% aluminum chloride in hexane at a temperature no higher than −10° F. is added to reactor 13 by line 12. The catalyst slurry is added at a rate of 1 lb. AlCl₃ per hour, per 100 gallon feed and the slurry is mixed with the feed by stirrer 14 so that the catalyst is maintained in suspension. Reactor 13 is a conventional low temperature reactor provided with external refrigeration by a conventional ethane cooler.

Polymer, as it is formed, dissolves in the large excess of hexane present in the reactor and is thus prevented from depositing on the surfaces of the reaction vessel. The solution of polymer in hexane is withdrawn as a slurry with aluminum chloride through line 15. Alcohol is added to the slurry in line 15 by means of line 45 and the resulting mixture is passed through heat exchanger 6, where it cools incoming feed. The heated polymer solution leaves the heat exchanger by line 16 and is contacted in orifice mixer 17 with a mixture of dilute caustic introduced through line 18 to kill the catalyst. This forms neutralization salts of aluminum which are settled out in settler 19, where two layers are formed, an upper layer consisting of a solution of polymer in hexane and isobutylene and a lower layer of dilute caustic containing neutralization salts of aluminum. The bottom layer is withdrawn through line 20 and the upper layer is passed by line 21 to flash drum 22, where the lower boiling materials are flashed off through line 23. A purge stream may be withdrawn through line 24, if desired. A polyisobutylene product having a molecular weight in the range of 10,000 to 20,000 or even up to 50,000 is withdrawn from the bottom of flash drum 22 through line 25.

A solution of isobutylene polymer in hexane is withdrawn as a side stream from flash drum 22 by line 26. A lubricating oil such as Essolube 20 is added to this stream through line 27 as a heavy carrier oil for the polymer. This mixture is passed to still 28, where it is distilled at a temperature of 200° F. under a pressure of 15 lbs. per sq. in. gage. A stream containing approximately 13% isobutylene and 85% hexane is withdrawn from the still through line 29, combined with the overhead from flash drum 22 and passed into knockout drum 30, where any water present in this stream is settled out and removed through line 31. The substantially dry mixture of isobutylene and hexane is recycled to distillation tower 3 by line 32 and line 2.

Bottoms from still 28 are passed by line 33 to a second still 34 operating at 300° F. under a pressure of 15 lbs. per sq. in. gage. This still removes the last traces of isobutylene and the remainder of the hexane from the solution of polymer in oil. The overhead withdrawn by line 35 from the top of still 34 consists of about 7.0% isobutylene, 85% hexane, and the remainder water and other minor constituents. Bottoms from still 34 are withdrawn by line 36 and passed to a third still 37. Still 37 is operated at atmospheric pressure and 300° F. to give an overhead stream containing any dimer and trimer present. Dry steam is admitted through line 38 to the base of still 37 to facilitate stripping off the light ends. Bottoms from still 37 are passed by line 39 to air drier 40 to remove any remaining moisture. The dried oil-polymer solution is then passed by line 41 to filter press 42 to remove any remaining aluminum salts. The finished solution of polybutene in oil is then passed by line 43 to storage tank 44.

While one embodiment of the invention has been illustrated and described with considerable particularity, it is not intended to limit the invention thereto or to the carrying out of this method by the use of apparatus of that character alone, as it will be evident that various changes may be made in the details thereof, if desired, without departing from its principal features and characteristics.

The nature and objects of the present invention having been thus described and illustrated, what is claimed as new and useful and is desired to be secured by Letters Patent is:

In a process for preparing polyisobutylene which comprises dissolving isobutylene in hexane, cooling the solution to −40° F., and incrementally adding to the solution of isobutylene in hexane 0.01 to 2.0% aluminum chloride, based on the isobutylene in the feed, as a 5% slurry in a commercial hexane which contains impurities normally adversely affecting the activity of the aluminum chloride and thus reducing the molecular weight of the polyisobutylene, the improvement which comprises mixing the aluminum chloride with the hexane at a temperature not exceeding −10° F., whereby the adverse affect of the impurities is overcome and the molecular weight of the polyisobutylene is increased.

References Cited in the file of this patent
UNITED STATES PATENTS

| | | |
|---|---|---|
| 2,317,878 | Bannon | Apr. 27, 1943 |
| 2,389,693 | Sparks | Nov. 27, 1945 |

OTHER REFERENCES

Powers: "Synthetic Resins and Rubbers," pages 224, 225, Wiley, (1943).